UNITED STATES PATENT OFFICE.

PETER E. MINOR, OF SCHENECTADY, NEW YORK.

IMPROVEMENT IN WATER-PROOF COMPOUNDS FOR COATING CLOTH, WOOD, METALS, &c.

Specification forming part of Letters Patent No. 112,370, dated March 7, 1871.

*To all whom it may concern:*

Be it known that I, PETER E. MINOR, of Schenectady, in the county of Schenectady and State of New York, have invented a new and useful composition of matter called "Minor's Air and Water Proof Compound," used for coating surfaces, and for saturating cloth, leather, paper, and other substances to protect them from the effects of air and water.

My invention consists in properly mixing and applying collodion, Venice turpentine, castor-oil, glycerine, and shellac.

The compound is prepared as follows, viz: Take of collodion, about thirty parts; Venice turpentine, about one part; castor-oil, about one part; shellac, dissolved in alcohol, about two parts; and glycerine, about one part; and place them all in one vessel, and stir them until they are thoroughly mixed together, when the compound is ready for use.

To apply my compound to surfaces a soft varnish or paint brush or sponge may be used, and any number of coats may be applied to thoroughly protect the surface from the air and water.

To saturate cloth, paper, or other substances, they are submerged in the compound for a sufficient time, varying in length in accordance with the nature of the article to be saturated, and as many times as may be required to render the substance impermeable.

This compound may be used instead of varnish or paint on all wooden, metallic, and other substances, and in place of rubber in the manufacture of impermeable fabrics; and it may be used also for roofing by covering it while soft with a coating of plaster-of-paris.

Coloring matter may be added to render the compound any required color; but when required to be transparent, or to be used on light-colored substances, the bleached shellac is used in making the compound.

What I claim, and desire to secure by Letters Patent, is—

The manufacture or preparation of the compound denominated "Minor's air and water proof compound," of the ingredients substantially in the manner and for the purposes set forth.

PETER E. MINOR.

Witnesses:
J. F. OLMSTEAD,
F. OLMSTEAD,
ST. JOHN B. S. SKINNER.